(12) United States Patent
Camy-Peyret

(10) Patent No.: US 11,632,850 B2
(45) Date of Patent: Apr. 18, 2023

(54) PLASMA CUTTING METHOD AND TORCH FOR IMPLEMENTING SAME

(71) Applicant: AKRYVIA, Nantes (FR)

(72) Inventor: Frédéric Camy-Peyret, Paris (FR)

(73) Assignee: AKRYVIA, Nantes (FR)

( * ) Notice: Subject to any disclaimer, the term of this patent is extended or adjusted under 35 U.S.C. 154(b) by 93 days.

(21) Appl. No.: 16/618,386

(22) PCT Filed: May 24, 2018

(86) PCT No.: PCT/EP2018/063621
§ 371 (c)(1),
(2) Date: Dec. 1, 2019

(87) PCT Pub. No.: WO2018/224323
PCT Pub. Date: Dec. 13, 2018

(65) Prior Publication Data
US 2020/0296818 A1    Sep. 17, 2020

(30) Foreign Application Priority Data

Jun. 7, 2017   (FR) ..................................... 17 55058

(51) Int. Cl.
*H05H 1/34* (2006.01)
*B23K 10/00* (2006.01)
*H05H 1/36* (2006.01)

(52) U.S. Cl.
CPC ........... *H05H 1/341* (2013.01); *B23K 10/006* (2013.01); *H05H 1/3405* (2013.01); *H05H 1/36* (2013.01)

(58) Field of Classification Search
CPC ............ H05H 1/26; H05H 1/34; H05H 1/341; H05H 1/3405; H05H 1/36; B23K 10/006
See application file for complete search history.

(56) References Cited

U.S. PATENT DOCUMENTS 5,538,765 A    7/1996  Kurihara et al.
5,653,895 A  * 8/1997  Shintani ................. B23K 10/00
                                                    219/121.5
(Continued)

FOREIGN PATENT DOCUMENTS

EP    3 790 756 A2    8/1997
EP    2 384 097 A1   11/2011
(Continued)

OTHER PUBLICATIONS

Choked Flow, Wikipedia article, https://en.wikipedia.org/wiki/choked_flow (Year: 2021).*

(Continued)

*Primary Examiner* — Justin C Dodson
(74) *Attorney, Agent, or Firm* — Im IP Law; Chai Im; C. Andrew Im

(57) ABSTRACT

A plasma cutting method providing a plasma torch having an electrode disposed within a first nozzle with a first exit section facing an end of the electrode. The first gas source supplies a gas to the first nozzle. A second nozzle is arranged concentrically around the first nozzle and has a second exit section substantially facing the first exit section. A second gas source supplies the gas between the first nozzle and the second nozzle. The electrode is supplied with a current, and the first and second nozzles are supplied with the gas to form a plasma with the gas introduced into the first nozzle. The surrounding pressure around the plasma jet in the second nozzle at the exit of the first nozzle is controlled to be at least superior to the atmospheric pressure and inferior to the pressure in the first exit section.

10 Claims, 1 Drawing Sheet

(56) References Cited

U.S. PATENT DOCUMENTS

| | | | | |
|---|---|---|---|---|
| 5,695,662 | A | * 12/1997 | Couch, Jr. | H05H 1/341 |
| | | | | 219/121.39 |
| 6,236,013 | B1 | 5/2001 | Delzenne | |
| 6,274,841 | B1 | * 8/2001 | Ramakrishnan | B23K 10/006 |
| | | | | 219/121.44 |
| 2006/0186094 | A1 | * 8/2006 | Krink | B23K 10/006 |
| | | | | 219/121.55 |
| 2008/0185366 | A1 | * 8/2008 | Suslov | C23C 4/134 |
| | | | | 219/121.47 |
| 2015/0334816 | A1 | * 11/2015 | Namburu | H05H 1/34 |
| | | | | 219/121.5 |
| 2016/0227640 | A1 | 8/2016 | Laurisch et al. | |
| 2017/0001255 | A1 | * 1/2017 | Winn | H05H 1/3405 |
| 2017/0182585 | A1 | * 6/2017 | Yamaguchi | H05H 1/28 |

FOREIGN PATENT DOCUMENTS

| | | | |
|---|---|---|---|
| GB | 1 025 678 | A | 4/1966 |
| JP | H06-508793 | A | 10/1994 |
| JP | H07-112278 | A | 5/1995 |
| JP | 2013164000 | A | 8/2013 |
| WO | 9218282 | A1 | 10/1992 |
| WO | 93/13905 | A1 | 7/1993 |

OTHER PUBLICATIONS

Heat Capacity Ratio, Wikipedia article, https://en.wikipedia.org/wiki/Heat_capacity_ratio (Year: 2022).*

* cited by examiner

PLASMA CUTTING METHOD AND TORCH FOR IMPLEMENTING SAME

RELATED APPLICATIONS

This application is a § 371 application of PCT/EP2018/063621 filed May 24, 2018, which claims priority from French Patent Application No. 17 55058 filed Jun. 7, 2017, each of which is incorporated herein by reference in its entirety.

FIELD OF THE INVENTION

The present invention relates to a plasma cutting method and a torch for the implementation of this method.

BACKGROUND OF THE INVENTION

The principle of plasma cutting has been known for about sixty years and has been the subject of many patent applications. This principle is used for cutting more or less thick sheets. A current is caused to circulate between an electrode and the sheet to be cut so as to form electric arc plasma. A nozzle concentrates this plasma which is heated by the Joule effect to reach very high temperatures. The nozzle has an exit orifice that directs the plasma jet. The plasma jet is further ejected at a high velocity through the orifice of the nozzle. Because of the high temperature, the sheet melts locally and the gas supply pressure generates the plasma jet out of the nozzle, whose velocity makes it possible to eject the molten metal under the sheet. In this way, a kerf is made into the piece to be cut.

One device for implementing this cutting principle is called a torch, in particular a plasma torch. Such a torch includes an electrode, a nozzle and a gas supply system for the nozzle.

To obtain a plasma jet suitable for cutting, characteristics of the electric arc and the gas supply must of course be respected. Parameters such as the distance between the electrode and the cutting plate, the current circulating between the electrode and the cutting plate, the gas pressure, etc. . . . should be maintained within a given range.

The performance of a plasma torch is assessed according to the fineness of the performed cut, its straightness and the cutting speed. A skilled person aims to obtain a finer and more energetic plasma jet at the sheet to be cut. The electric field in the nozzle allows to obtain a good indication of the energy intensity of the plasma. It is proportional to the current density circulating in the plasma. The average electric field can be easily estimated by dividing the voltage of the electric arc by the distance between the end of the electrode and the sheet to be cut.

To increase the performance of a plasma torch, document GB1025678 proposes to use a gas passage, or nozzle, with a diameter less than one millimeter to obtain a fine and supersonic plasma jet and thus to have a disturbed area thermally limited at the region of the cut in the piece. A small volume of plasma is formed in a discharge chamber at a pressure between 30 and 100 atmospheres (from about 3 to $10 \times 10^6$ Pa) between a cathode and the gas passage entry.

However, the increase in pressure in the nozzle, with supersonic gas velocities, generates shock structures in the plasma jet at the exit of the nozzle. To solve these problems, it is then necessary to move the piece to be cut away from the nozzle to avoid interactions of the shock waves structures with the molten metal. As a result, the power density available at the sheet substantially decreases by thermal diffusion between the exit of the nozzle and the sheet, an area where the plasma jet is no longer concentrated by the nozzle.

Currently, most plasma cutting equipment on the market work with gas pressures of 10 bar or less (about $10^6$ Pa) and maximum arc voltages of about 150 V with distances between the electrode and the piece to be cut greater than 10 mm, corresponding to a maximum electric field of 15 kV/m.

It is also known to provide a plasma torch with a second nozzle placed downstream of (or around) the first nozzle so as to form a layer of protective gas around the plasma jet. The second nozzle is then often supplied with an inert gas or air. Document EP2384097 describes such a nozzle which is here optimized for the upstream cooling of the plasma nozzle provided with an opening forming a nozzle through which the plasma jet flows. The plasma torch described in this document therefore has the advantages of an ionized plasma gas flow as well as a cooling of the nozzle and its protection against the molten metal projections that may occur during the use of the torch, and in particular during the piercing phases.

OBJECT AND SUMMARY OF THE INVENTION

The purpose of the present invention is therefore to provide a plasma cutting torch making it possible to obtain both an energetic intensification of the plasma and a conservation of the power density generated within the torch (nozzle) down to the piece to be cut.

The invention thus aims to obtain a fine plasma jet while avoiding an intensification of the shock structures when the supply pressure in the nozzle increases.

For this purpose, the present invention firstly proposes a method for plasma cutting a piece to be cut, comprising the following steps:

providing a plasma torch comprising an electrode within a first nozzle having a first exit section facing an end of the electrode, first gas supply means for said first nozzle, a second nozzle concentrically around the first nozzle with a second exit section substantially facing the first exit section and gas supply means between the first nozzle and the second nozzle, supplying the electrode with a current and the first nozzle and the second nozzle with a gas so as to form a plasma with the gas introduced into the first nozzle.

According to the present invention, the surrounding pressure around the plasma jet in the second nozzle at the exit of the first nozzle is controlled so as to be, on the one hand, at least greater than the atmospheric pressure and, on the other hand, less than the pressure in the first exit section.

In this way, the secondary gas flow is used not only to protect the plasma jet but also to contain it by limiting its width and by acting on the shock structures.

In such a plasma cutting method, the ratio between the pressure in the plasma jet in the first exit section and the surrounding pressure around the plasma jet between the first nozzle and the second nozzle is advantageously between 1 and 5, preferably between 2 and 4 and more preferably between 2.4 and 2.6.

According to one embodiment the pressure in the first exit section is obtained from the total generating pressure in the first nozzle and a coefficient corresponding to the ratio of specific heats at a constant pressure and volume of the plasma.

In such a plasma cutting method, the surrounding pressure around the plasma jet can also be regulated by varying the distance separating the second exit section from the piece to be cut. It will be apparent to the person skilled in the art that the smaller the distance between the piece to be cut and the exit of the second nozzle (corresponding in other words to the second exit section), the more this distance has an influence on this surrounding pressure. Indeed, the piece to be cut generates a counter-pressure on the flow of gas (called downstream gas) between the first nozzle and the second nozzle since it hinders the flow of this downstream gas. The more this distance increases, the more the counter-pressure decreases to become rapidly negligible.

As a non-limiting illustration, the gas supply pressure in the first nozzle may for example be greater than 5000 hPa and preferably between 8000 and 20000 hPa. Similarly, regarding the electrical values, the average electric field in the plasma jet can be for example superior to 15 kV/m.

Tests have shown that the current intensity in the plasma jet is preferably an affine function of the gas supply pressure for the first nozzle. Thus, the current intensity, and thus the apparent current density (in $A/mm^2$) which is directly proportional thereto, increases as the plasma gas supply pressure increases, which enables to maintain significant power densities throughout the plasma jet.

In a plasma cutting method according to the invention, the surrounding pressure around the plasma jet at the exit section of the first nozzle can be substantially equal to the atmospheric pressure (less than 1500 hPa) during an ignition phase for a plasma jet, a transfer phase and a piercing phase while said pressure then increases for a cutting phase.

In a method such as described above, the second nozzle can come into contact with the piece to be cut during at least one phase of a cutting cycle. As explained above, this makes it possible to act on the surrounding pressure around the plasma jet between the two nozzles.

Next, the present invention further relates to a plasma cutting torch comprising an electrode within a first nozzle having a first exit section facing an end of the electrode, first gas supply means for said first nozzle, a second nozzle concentrically around the first nozzle with a second exit section substantially facing the first exit section and second gas supply means between the first nozzle and the second nozzle.

According to the invention, such a torch also comprises means for regulating the second supply means from at least one sensor connected to the first supply means.

According to one embodiment, such a torch comprises a first sensor determining a pressure in the first nozzle, a second sensor determining a pressure in the second nozzle and a control line for the pressure in the second nozzle. This plasma cutting torch may further comprise a control line for the pressure in the first nozzle.

According to an alternative embodiment, the first nozzle comprises a channel ending in the exit section, and said channel is provided with a diverging portion.

In a plasma cutting torch as described herein, the critical section for the downstream gas (corresponding to the second supply means) is preferably the second exit section, i.e. the exit section of the second nozzle. The torch is then advantageously designed in such a way that the passage section between the first nozzle and the second nozzle is always greater than the second exit section, preferably always greater by at least 1.5 times than this second exit section.

According to another variant of a torch of the invention the second nozzle can be movably mounted relative to the first nozzle. In this other variant, the relative movement of the second nozzle relative to the first one can correspond to a torque ball movement around the exit section and/or an axial movement along a longitudinal axis defined by the first nozzle and/or a movement in a transverse plane to the first nozzle and in the cutting direction around the center of the exit section of the first nozzle.

Finally, in a torch as described above, the second nozzle preferably has an exit section whose diameter is between 2 and 30 times the diameter of the exit section of the first nozzle.

BRIEF DESCRIPTION OF THE DRAWINGS

Details and advantages of the present invention will become more apparent from the following description, given with reference to the appended schematic drawing in which.

DETAILED DESCRIPTION OF THE EMBODIMENTS

Figure 1:
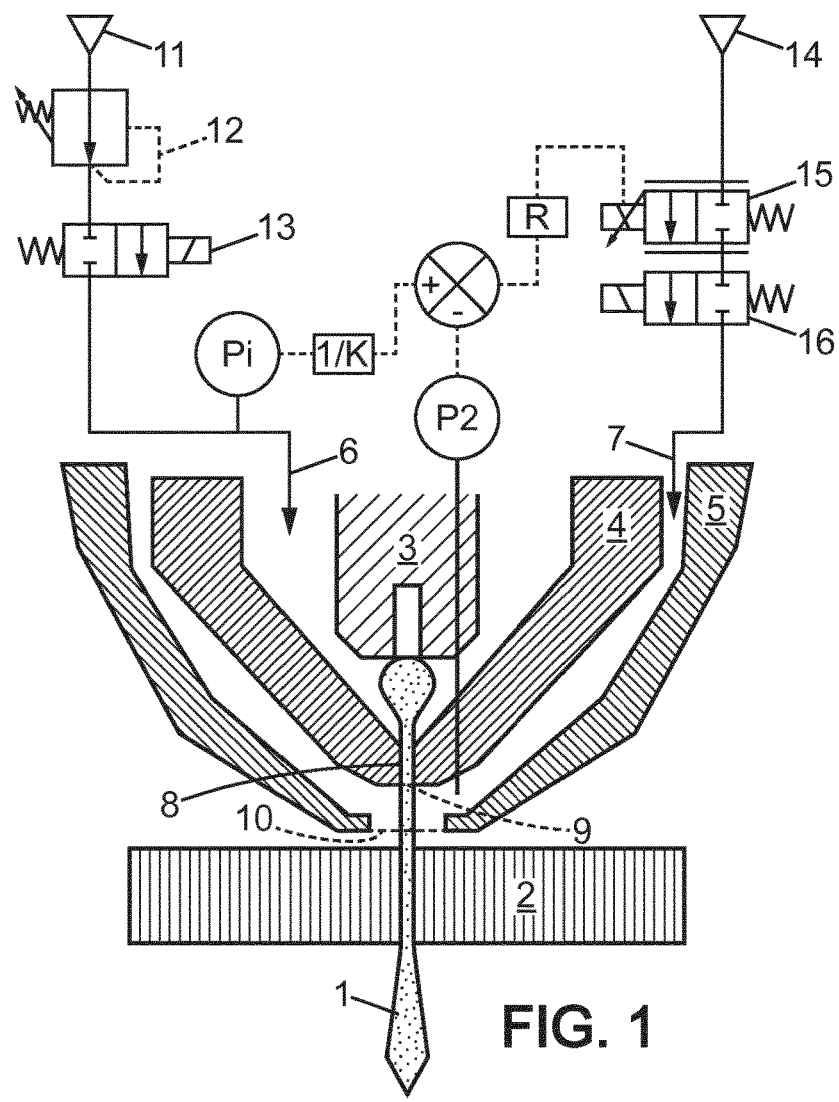
FIG. 1 is a schematic longitudinal sectional view of a plasma cutting torch according to the present invention.

FIG. 1 schematically illustrates a longitudinal sectional view of a plasma cutting torch. The structure of this torch resembles that of a prior art torch. An electrode 3 is arranged at the center of the torch and extends in a so-called longitudinal direction. A first nozzle, or plasma nozzle 4, is arranged around this electrode 3 and a second nozzle, or downstream nozzle 5, is arranged outside this nozzle, concentrically mounted relative to the electrode 3. This assembly is mounted so as to face a piece 2, for example a metal sheet of great thickness.

The electrode 3 is for example a prior art electrode for use in a plasma torch. As schematically illustrated in FIG. 1, it has a generally circular cylindrical shaped body made of an electricity- and heat-conductive material for example out of copper or a copper-based alloy. One can note at the end of the electrode 3 the presence of an insert which is most often made of a thermo-emissive material, such as for example tungsten, which has a very high melting temperature, or hafnium (or other). Depending on the materials to be cut and the nature of the plasma, one material will be preferred over another.

The means for electrically supplying the electrode 3 are not shown in the drawing and will not be described here. Supplying and regulating means known to those skilled in the art and commonly used on prior art plasma cutting torches can be used here.

The first nozzle, or plasma nozzle 4, has substantially a shape generated by revolution around the longitudinal axis of the electrode 3 and thus has a substantially conical shape. A first passage 6 is left free between the electrode 3 and the inner wall of the plasma nozzle 4. At its summit, on its axis of revolution, the plasma nozzle 4 comprises a channel 8 which has an exit section 9 at the outer surface of the plasma nozzle 4. The channel 8 is represented here in its preferred embodiment corresponding to a circular cylindrical channel (thus with a constant circular section) but this channel could also have a diverging portion ending in the exit section. 9. In the case of a plasma nozzle 4 with a channel 8 provided with a diverging portion allowing the output pressure of the plasma nozzle 4 to be reduced down to an intermediate value between the pressure at the neck and the atmospheric pressure, the diverging portion will preferably be designed so that this intermediate value does not reach however the atmospheric pressure.

The second nozzle, or downstream nozzle 5, also has a shape generated by revolution around the longitudinal axis of the electrode 3. It also has a generally conical shape, with a slightly larger apex angle than that of the plasma nozzle 4. A second passage 7 is also provided between the plasma nozzle 4 and the downstream nozzle 5. On the axis of revolution, at the top of the downstream nozzle 5, there is also a through opening with an exit section 10 on the outer surface of the downstream nozzle 5. The exit section 10 is larger than the exit section 9 of the plasma nozzle 4.

The material for producing the plasma nozzle 4 and the downstream nozzle 5 is preferably a good heat-conductive material. It may be a copper alloy (for example of CuAl or CuTe or CuCrZr type) or an aluminum alloy or a brass (or other). The nozzles are furthermore preferably cooled, for example by means of the flowing gases and/or by a dedicated system with a separate cooling fluid. FIG. 1 does not illustrate such cooling means, which can be integrated to the illustrated torch.

The piece 2 to be cut, illustrated here, is a sheet perpendicular to the axis of revolution of the nozzles, another arrangement known to those skilled in the art as a cut with a non-right angle for the chamfer cut being possible according to the invention.

Gas supply means for the first passage 6 are provided. They comprise firstly a source of plasma gas 11 and a supply line extending from said source to the first passage 6. The source of plasma gas 11 may be for example simply a gas cylinder, for example compressed air, oxygen or any other gas adapted to the material to be cut, known to those skilled in the art, preferably provided with a pressure reducer. It may also be an industrial gas network, a tank of gas stored at low temperature under liquid phase, a gas generator, etc. . . . . The first supply line comprises a first pressure regulator 12 and a shut-off valve 13. There is also on this first supply line, as downstream as possible, a pressure sensor giving a plasma gas supply pressure. This supply pressure is called Pi.

There are also gas supply means for the second passage 7. These means comprise a downstream gas source 14 and a supply line extending from said source to the second passage 7. This second supply line comprises a second pressure regulator 15 and a shut-off valve 16. The downstream gas source may here also be a gas cylinder (preferably with an expansion valve), an industrial network, a generator, liquefied gas, etc. The downstream gas may be an inert gas, such as nitrogen, but it may also be for example air.

The torch further comprises a pressure sensor measuring the pressure P2 in the downstream nozzle 5, between the exit section 9 of the plasma nozzle 4 and the opening in the downstream nozzle 5. This pressure sensor measuring P2 is disposed as close as possible to the axis of revolution of the downstream nozzle 5 so as to give a value representative of the surrounding pressure in the exit section 9 of the plasma nozzle 4. If the sensor measuring P2 is remote from the exit section 9 of the plasma nozzle 4, a correction can be made to the measurement as a function of the calculated pressure drop between the measuring point and the zone surrounding the exit section 9 of the plasma nozzle 4. This correction may take into account the total pressure loss due to losses as well as the dynamic pressure drop due to the gas velocity. In this case, a flow sensor (not shown) is provided upstream in the downstream gas supply line.

A regulating device is provided for acting on the second pressure regulator 15 in the second passage 7 (downstream gas). One can note in FIG. 1 that the presence of a multiplier (by a coefficient 1/K) for the pressure measured in the first passage 6 (pressure Pi). The value thus obtained is compared with the measured pressure P2 and the second pressure regulator 15 is controlled to maintain the value (Pi/K)−P2 at zero. In this way, a ratio Pi/P2 is maintained at the value K. As explained below, the coefficient K is preferably chosen between 1.65 and 9.5.

Measurements and pressure regulations are preferably performed electronically (in an analog or digital manner) but it may be envisaged to use a purely mechanical (pneumatic) technology or a combination of mechanical and electronic technologies. By way of purely illustrative and non-limiting example, FIG. 1 shows a first pressure regulator 12 which is a mechanical regulator and a second pressure regulator 15 which is a proportional valve of electronic technology. Most often, those skilled in the art will choose the same technology (electronic or mechanical or otherwise) for all the components but any "mix" of technologies can be envisaged.

As an alternative embodiment, it can be provided that the surrounding pressure of the plasma jet between the nozzles (plasma nozzle 4 and downstream nozzle 5) can also be controlled by the height between the exit section 10 (which can be considered as the end) of the downstream nozzle and the surface of the piece 2 to be cut (or sheet), in addition to the pressure regulator.

When the electrode 3 is supplied with current, that the piece 2 to be cut, supposedly conductive here, is connected to a reference potential (mass), the plasma nozzle 4 is supplied with plasma gas and the downstream nozzle 5 is supplied with downstream gas, a plasma jet 1 of electric arc is generated. It originates at the insert of the electrode 3, is channeled through the channel 8 and then passes through the opening in the downstream nozzle 5 before reaching the piece 2 to be cut.

For cutting of the piece 2, it is proposed here to ensure that the surrounding pressure around the plasma jet in the surrounding volume of the exit section 9 of the plasma nozzle 4 and up to the piece 2 to be cut be greater than the atmospheric pressure and be controlled so as to maintain a fine plasma jet, to avoid the intensification of shock structures when the plasma gas supply pressure increases and to maintain a power density of the plasma jet generated in the plasma nozzle 4 down to the piece 2 to be cut. For this purpose, it is intended to adjust the pressure P2 (surrounding pressure around the exit section 9 of the plasma nozzle 4, between the two nozzles) so that the ratio of the mean absolute ejection pressure Pj of the plasma jet at the exit section 9 of the plasma nozzle 4 to the surrounding pressure P2 of said plasma jet between the two nozzles, so-called Nozzle Pressure Ratio or NPR, is maintained between 1 and 5.

When the NPR ratio is 1, the exit pressure is equal to the surrounding pressure and the torch then operates in an adapted mode. Conversely, when this ratio is 5, the torch operates in a limit regime (upper limit) of under-expanded plasma jet with a barrel shock structure, the diameter of the first straight shock reaching a dimension close to the diameter of the exit section 9 of the plasma nozzle 4.

The regulation of the pressure in the downstream nozzle is not only performed during a cutting phase of the cutting method for the piece 2 to be cut. For example, the surrounding pressure P2 may be provided at the exit section 9 of the plasma nozzle 4 so as to be substantially equal to the atmospheric pressure during ignition, transfer and piercing phases and so as to be then greater than the atmospheric pressure during a cutting phase.

It is considered here that the exit section 9 of the plasma nozzle 4 is the critical section (case corresponding to a channel 8 of constant circular cross section). A good estimate of the pressure Pj in the exit section 9 is then given by the formula:

$$Pj = Pi\left(\frac{2}{\gamma+1}\right)^{\frac{\gamma}{\gamma-1}}$$

Pi is the above-mentioned pressure. This is the total generating pressure in the plasma nozzle, i.e. the plasma gas supply pressure less the losses in the plasma nozzle 4.

γ is an estimate of the ratio of specific heat at a constant pressure to the specific heat at constant volume for the plasma.

γ is generally between 1.0 and 1.4. Thus, the ratio Pi/Pj is generally between 1.65 and 1.9. With the ratio Pj/P2 between 1 and 5, a coefficient K=Pi/P2 between 1.65 and 9.5 is then obtained.

The coefficient K is in fact preferably between 3 and 6 and a good compromise for this coefficient is generally around 5.5.

In the non-illustrated case, in which the channel 8 would have a diverging portion, the mean pressure in the exit section 9 can also be estimated but with another formula involving the Mach number in the exit section 9. In this case:

$$\frac{p_i}{p} = \left(1 + \frac{\gamma-1}{2}M^2\right)^{\gamma/(\gamma-1)}$$

with, in addition:

$$\frac{A}{A_*} = \frac{1}{M}\left[\frac{2}{\gamma+1}\left(1 + \frac{\gamma-1}{2}M^2\right)\right]^{\frac{(\gamma+1)}{2(\gamma-1)}}$$

where A corresponds to the exit section 9 and A* corresponds to the critical (minimum) section of the channel.

By regulating the downstream gas pressure as explained above, the torch produces a plasma jet, which can be intensified, i.e. the average current density or the average electric field between the electrode 3 and the piece 2 to be cut can be significantly increased, by increasing the plasma gas supply pressure while maintaining this power density of the plasma jet down to the surface of the piece 2 to be cut, since the expansion of the plasma jet and the intensity and size of the shock waves in the jet are contained. It also becomes possible to operate at cutting heights between the piece 2 to be cut and the plasma nozzle 4 (or the electrode 3) lower than for the prior art torches. Tests have shown that it is possible, with the technology presented here, to have a cutting height of less than 4 times the diameter of the plasma nozzle 4, so that the thermal diffusion of the temperature profiles in the plasma jet is low and the cutting precision (kerf width) is significantly improved. This reduction of the kerf width compared to the state of the art has for additional beneficial effect of improving the energy efficiency of the cut, since the specific volume of metal to be melted and ejected per linear meter cut is less important. Accordingly, it is possible to improve the productivity of the cutting method, i.e. to perform a faster or thicker cut with a same current intensity.

The cutting height may also influence the surrounding pressure P2. Indeed, when this cutting height decreases, a counter-pressure is opposed to the flow of the downstream gas and thus modifies the surrounding pressure P2. This cutting height must also be taken into account if it becomes low, i.e. the pressure exerted is no longer negligible. The calculation of said counter-pressure depends, in addition to the distance between the piece 2 to be cut of the exit section 10 of the downstream nozzle 5, also on the exit section 10 and possibly the shape thereof (for example if it is diverging).

As an illustrative and not limitative numerical example, the gas supply pressure plasma can be for example greater than 5 bars during at least one phase of a cutting cycle, preferably between 6 and 100 bars, ideally between 8 and 20 bars. It is also possible that the average electric field in the plasma jet, defined as ratio of an arc voltage to the distance between the electrode 3 and the piece 2 to be cut, is greater than 15 kV/m for all or part of a cutting phase of a cycle of the method.

In the plasma cutting method described herein, the current for a given exit section diameter 9 of the plasma nozzle 4 can also depend on the supply pressure Pi of the plasma nozzle 4 during at least one phase of the cutting process. The intensity could for example be an affine function of the supply pressure and can thus be expressed as follows: I=a+b·P, a and b being constants to be determined according to the geometry of the torch. This current can be dynamically controlled by the pressure in the plasma nozzle 4 during all or part of ignition, piercing and/or cutting cycle.

Figure 2:
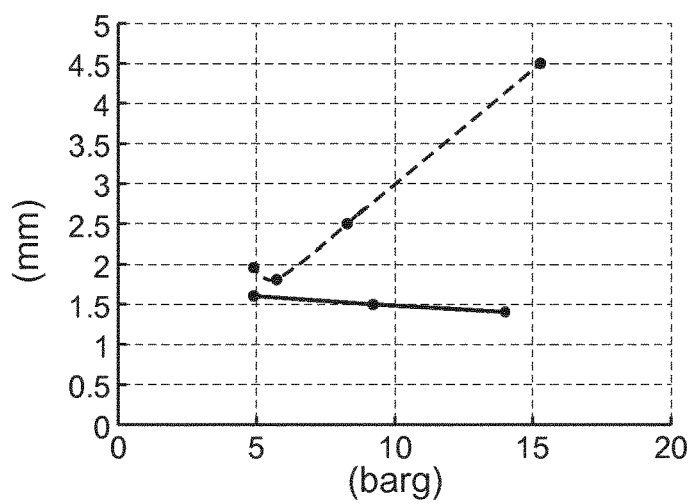
FIG. 2 is a diagram illustrating the performance that can be obtained by the present invention with respect to a prior art plasma cutting torch.

FIG. 2 illustrates in a diagram the performances obtained by regulating the downstream gas pressure (solid line) compared to the performances obtained without adapted regulation (dashed line).

In an exemplary embodiment, a plasma cutting torch is first operated at 60A. This torch is equipped with a plasma nozzle 4 having a channel of 1 mm in diameter, supplied with air as a plasma gas, and a downstream nozzle 5 with an exit section 10 of 4 mm in diameter. The downstream nozzle 5 is supplied with compressed air, used here as a downstream gas, so that the pressure P2 measured around the exit section 9 of the plasma nozzle 4 can be controlled between 0 bar (i.e. an absolute pressure of 1 bar or about 100,000 Pa), corresponding to the reference operation without pressure adaptation, and 3 bars. This torch was used to cut pieces (sheets) of mild steel of 5 mm in thickness, by varying the supply pressures of the plasma nozzle 4 and the downstream nozzle 5. The upper kerf width of the cuts was then measured in the cases with and without regulation (adaptation) of the pressure P2 and plotted in FIG. 2.

It is observed that the implementation of the invention (continuous curve), in which the pressure P2 is gradually increased from 0 to 0.9 and then to 1.25 bar (respectively 0 and 90,000 and 125,000 Pa), allows a decrease in the kerf width (ordinate in FIG. 2) when increasing the supply pressure in the plasma nozzle 4 (x-axis in FIG. 2).

On the other hand, the behavior of the torch in conventional regime (P2 equal or close to zero) implies a significant increase in the kerf width with the plasma nozzle of the supply pressure 4 above the conventional pressure, here about 5 bars.

In the example illustrated in FIG. 2, the ratio of the supply pressure Pi in the plasma nozzle 4 to the pressure P2 is constant and approximately equal to 5.5.

In another embodiment of the same torch in operation with pressure regulation, it has been possible to increase the intensity of the current to achieve the cutting with a high pressure supply of the plasma nozzle up to 130 A, or an apparent current density of 165 A/mm$^2$, much higher than the conventional apparent current density values of 60 A/mm$^2$ (value cited for example in document U.S. Pat. No. 5,123,512) and to proportionally increase the cutting speed up to 5 m/min while maintaining low grove widths as observed in the first embodiment.

In order to achieve a good regulation of the gas pressure in the downstream nozzle 5, the geometric design thereof and that of its supply system must allow an increase in the pressure P2 up to the desired value P2=Pi/K. For this purpose, the shape of the downstream nozzle 5 is for example such that the passage sections of the downstream gas supply circuits from the downstream gas source 14 to the exit section 10 of the downstream nozzle 5 are everywhere superior to the same exit section 10, so that the exit section 10 is the critical section for the gas flow, so-called downstream gas.

In addition, as regards the plasma gas supply and the dynamic elements for regulating the pressure in the corresponding supply line, all components are of course dimensioned so as to allow the passage of the maximum flow rate corresponding to this critical section.

To fulfill these conditions, it is estimated that the diameter of the exit section 10 of the downstream nozzle 5 is preferably between 2 and 30 times the diameter of the exit section 9 of the plasma nozzle 4.

The "height" of the downstream nozzle 5, defined as the distance between the exit section 9 of the plasma nozzle 4 and the exit section 10 of the downstream nozzle 5, is chosen for example between 0 and 10 mm, preferably between 0 and 5 mm.

As an alternative embodiment, the downstream nozzle 5 can be movable with respect to the plasma nozzle and can move relatively to this one, which is considered as fixed in the reference frame of the torch.

The relative movement of the downstream nozzle 5 with respect to the plasma nozzle may for example be exclusively linear along the longitudinal axis. In order to control this movement, an elastic thrust system, for example a spring or pneumatic system (by means of the secondary gas for example), can be provided (not illustrated in the drawing), which is oriented outwardly with respect to the plasma nozzle 4 on the one hand, and which abuts on the first of the surfaces formed by the piece 2 to be cut, or a stop shoulder in translation, on the other hand.

The relative movement of the downstream nozzle 5 with respect to the plasma nozzle could also be exclusively a swivel movement about the center of the exit section 10 of the downstream nozzle 5.

According to another embodiment, the relative movement of the downstream nozzle 5 with respect to the plasma nozzle could also be a sliding movement only in a plane perpendicular to the plasma nozzle 4 and in the direction of the cut around the center of the section exit 10 of the downstream nozzle 5.

The relative movement of the downstream nozzle 5 with respect to the plasma nozzle could also be a combination of at least two of the three above-mentioned movement.

In the case of a ball-and-socket-type movement, it may be controlled for example by the angle between the plasma nozzle 4 and the sheet to be cut so that the exit section 10 of the downstream nozzle 5 is maintained parallel to the surface of the sheet during at least one phase of the cycle of the method.

In an alternative embodiment of a cutting method, the downstream nozzle may have at least one point of contact with the sheet during at least one phase of the cutting cycle.

In summary, it is thus proposed here a plasma cutting method and an electric arc plasma cutting torch using, inter alia, an electrode, a plasma nozzle or upstream nozzle facing this electrode, the space between said electrode being supplied with a plasma gas, said plasma nozzle comprising an opening (channel) for a plasma jet flowing therethrough, wherein the surrounding pressure around the plasma jet between the exit section of said plasma nozzle and a piece to be cut is greater than the atmospheric pressure during at least one phase of a cutting cycle.

The surround pressure above the atmospheric pressure is established by means of at least a second nozzle downstream of the plasma nozzle, and so-called downstream nozzle, which is supplied with a secondary gas.

The gas supply of the downstream nozzle is provided by at least one pressure regulator, preferably a mechanical or electronic one, whose setting value depends on the supply pressure of the plasma nozzle. This pressure regulator uses for example a pressure measurement signal whose pressure tapping is located in a space between the plasma nozzle and the downstream nozzle, preferably close to the exit section of the plasma nozzle.

For a good gas supply of the downstream nozzle, the supply circuit thereof is preferably such that the gas passage sections, anywhere in the supply circuit, between a source of secondary gas under pressure and the downstream nozzle, are greater than the minimum of the two following sections: exit section of the downstream nozzle or annular section of the surface formed by the projection of the exit edge of the downstream nozzle on the surface of the material to be cut during a cutting phase of the cycle.

As mentioned above, the NPR ratio (Nozzle Pressure Ratio) between the average absolute pressure in the plasma jet in the exit section of said plasma nozzle to the surrounding pressure is preferably between 1 and 5, preferably between 2 and 4, ideally about 2.5. Thus, for a nozzle having a cylindrical plasma exit channel, the ratio of the total supply pressure of the plasma nozzle to the supply pressure in the downstream nozzle is then advantageously between 1.65 and 9.5, ideally between 3 and 6, even more ideally about 5.5.

Finally, the plasma gas may be different from the downstream gas, but it may also be identical to the downstream gas. In this case, the plasma gas source 11 and the downstream gas source 14 may be one single source of gas, for example a gas cylinder or an industrial gas network, as explained above. This common gas is for example air, oxygen or any other gas. The first supply line and the second supply line are then connected together to this gas source.

Of course, the present invention is not limited to the preferred embodiment described above and the variants envisaged. It also relates to the embodiments (device and method) within the reach of those skilled in the art within the scope of the claims below.

The invention claimed is:

1. A method of plasma cutting a piece to be cut, comprising:
   providing a plasma torch comprising an electrode disposed within a first nozzle having a first exit section facing an end of the electrode, a first gas source to supply a first gas to the first nozzle, a second nozzle arranged concentrically around the first nozzle and having a second exit section substantially facing the first exit section, and a second gas source to supply a second gas between the first nozzle and the second nozzle via a gas supply circuit having gas passage sections between the first nozzle and the second nozzle, the gas passage sections between the second gas source under pressure and the second nozzle are greater than the minimum of the two following sections: the second exit section of the second nozzle and an annular section of a surface formed by a projection of an exit edge of the second exit section of the second nozzle on a surface of the piece to be cut;

supplying the electrode with a current and respectively supplying the first nozzle and the second nozzle with the first gas and second gas to form a plasma with the first gas introduced into the first nozzle;

controlling a surrounding pressure around a plasma jet between the first exit section and the second exit section to be at least greater than an atmospheric pressure and less than a pressure of the plasma jet in the first exit section, the surrounding pressure being controlled between 0 bar corresponding to an absolute pressure of 1 bar and 3 bars; and wherein a ratio of the pressure of the plasma jet in the first exit section to the surrounding pressure is greater than 1 and less than or equal to 5.

2. The plasma cutting method according to claim 1, wherein the pressure in the first exit section is obtained from a total generating pressure in the first nozzle and a coefficient corresponding to a ratio of heat of the plasma at constant pressure and a volume of the plasma.

3. The plasma cutting method according to claim 1, wherein a gas supply pressure in the first nozzle is greater than 5000 hPa.

4. The plasma cutting method according to claim 1, wherein the surrounding pressure around the plasma jet is regulated by varying a distance between the second exit section and the piece to be cut.

5. The plasma cutting method according to claim 1, wherein an average electric field in the plasma jet is greater than 15 kV/m.

6. The plasma cutting method according to claim 1, wherein an intensity of current in the plasma jet is an affine function of a gas supply pressure in the first nozzle.

7. The plasma cutting method according to claim 1, wherein the surrounding pressure around the plasma jet is less than 1500 hPa during a priming phase of the plasma jet, a transfer phase and a piercing phase of a cutting cycle, and the surrounding pressure increases during a cutting phase of the cutting cycle.

8. The plasma cutting method according to claim 7, wherein the second nozzle comes into contact with the piece to be cut during at least one phase of the cutting cycle.

9. The plasma cutting method according to claim 1, wherein the ratio of the pressure of the plasma jet in the first exit section to the surrounding pressure is between 2 and 4.

10. The plasma cutting method according to claim 1, wherein the ratio of the pressure of the plasma jet in the first exit section to the surrounding pressure is between 2.4 and 2.6.

* * * * *